July 10, 1923.
W. C. MOLL
1,461,043
FISHING REEL
Filed May 7, 1921
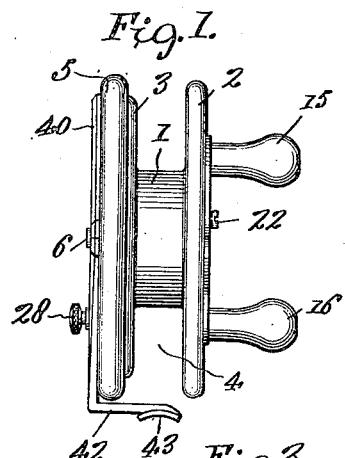
Fig. 1.
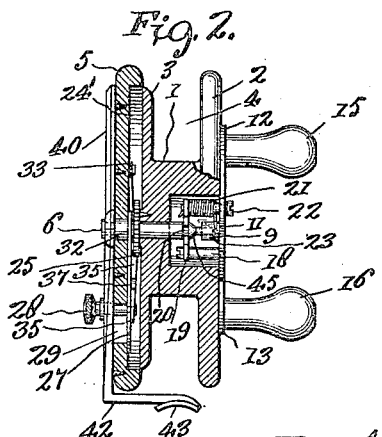
Fig. 2.
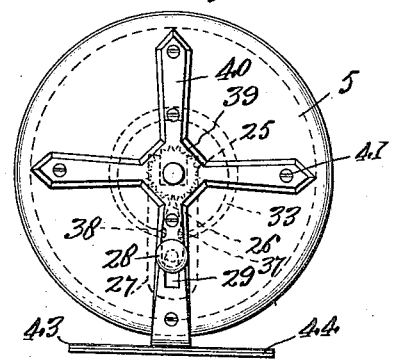
Fig. 3.
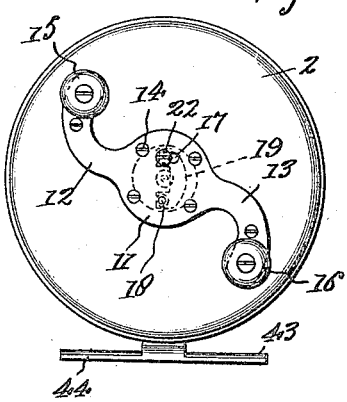
Fig. 4.
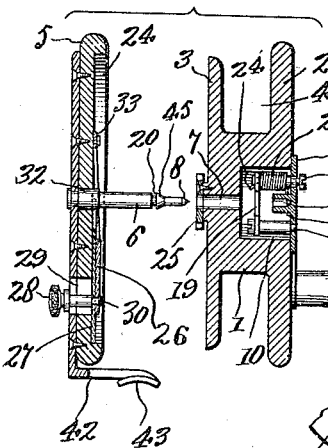
Fig. 5.
Fig. 6.
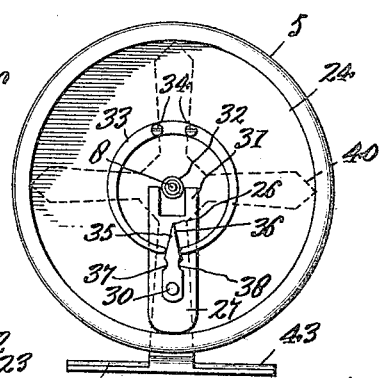
Fig. 7.
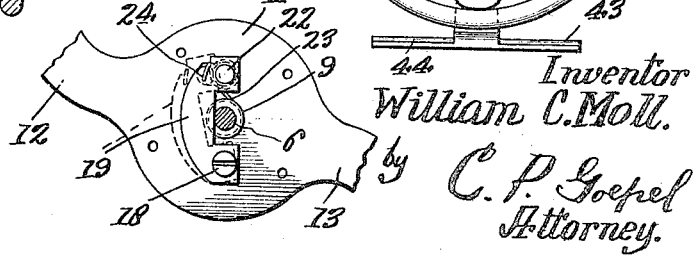
Inventor
William C. Moll.
by C. P. Goepel
Attorney.

Patented July 10, 1923.

1,461,043

UNITED STATES PATENT OFFICE.

WILLIAM C. MOLL, OF BROOKLYN, NEW YORK.

FISHING REEL.

Application filed May 7, 1921. Serial No. 467,561.

*To all whom it may concern:*

Be it known that WILLIAM C. MOLL, a citizen of the United States, residing at Brooklyn, in the county of Kings and State of New York, has invented certain new and useful Improvements in Fishing Reels; and he hereby declares the following to be a full, clear, and exact description of the invention, such as will enable others skilled in the art to which it appertains to make and use the same.

The present invention relates to improvements in fishing reels, and more particularly to a fishing reel in which a portion thereof may remain as a more or less permanent fixture on the rod or pole and having a line receiving drum detachably associated with this fixture so that a number of drums may be always kept on hand with lines of varying weights and hooks of a variety of sizes to be substituted in conjunction with the fixture on the rod or pole according to the different characters of fish sought.

An object of the invention is to provide an improved fishing reel in which its detachability of the drum from the remaining portion of the reel is effected in a quick and ready manner and which will not interfere with the rotation of the reel when winding or unwinding the line, and which will not be apt to become loosened permitting of the unexpected detachment of the drum.

Other objects of the invention reside in providing an improved reel having a novel form of ratchet mechanism and in so positioning and disposing this ratchet mechanism in conjunction with the separable parts of the reel as to permit of the quick exposure of the various elements of the mechanism in case of needed adjustment, repair or replacement.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is an edge view of an improved fishing reel constructed according to the present invention;

Fig. 2 is a vertical central sectional view taken therethrough with parts shown in elevation;

Fig. 3 is a view in rear elevation of the reel;

Fig. 4 is a front view of the reel;

Fig. 5 is a vertical sectional view with the head and drum separated;

Fig. 6 is an inside plan view of the detachable head; and

Fig. 7 is a fragmentary interior plan of the detachable plate for the drum showing the interlocking mechanism with the spindle illustrated in section.

Referring more particularly to the drawings, which disclose only a single embodiment of the invention, 1 designates a drum having a permanent head 2 at one side which may, for advantages in construction, be included in the same piece with the drum body 1; and 3 represents a flange at the opposite side of the drum body 1 providing between such flange 3 and the head 2 a space 4 for the winding of the fishing line. In like manner the flange 3 is also preferably made in one with the reel body 1 and the head 2 and the material is preferably wood to secure a desired lightness in a large reel.

At 5 is shown a detachable head for the drum which is also preferably made of wood and is of a diameter to compare with that of the head 2 although it may be slightly larger, as shown in the drawings, or smaller if found desirable. The detachable head 5 carries a spindle 6 which projects to a suitable distance and is adapted to enter through a central axial opening 7 made in the drum, and the pointed extremity 8 of the spindle 6 is adapted to finally lie within a complementary conically formed socket 9 projecting into a recess 10 made through the permanent head 2 and into the drum body 1.

A plate 11 carries, and in fact may be cast with the socket 9, and acts to close the recess 10, such plate having curved arms 12 and 13 extending out in a direction that is generally radial, being secured to the drum and head 2 as by screws 14 and 15 or other appropriate fastenings. The outer extremities of the arms 12 and 13 form suitable supports to which to affix the handles 15 and 16 affording the necessary grasp for the fisherman's hand in turning the reel. In the cover plate 11 a slot 17 is made of a short length and preferably on a slight arc which is struck from the center of a stud pin 18 forming the pivot or fulcrum point of a swinging detent 19 which lies within the recess 10 in the reel body and swings in a plane at right angles to the axis of the spindle 6, which latter is formed with an annular groove 20 in position to receive the edge of the detent 19 when the drum and its detachable head are in the assembled condition shown in Fig. 2.

A coil spring 21 is wound about an operating pin 22 which projects through the slot 17 on the exterior of the drum and enables the detent 19 to be withdrawn from the groove 20 into which it is normally urged by the action of the coil spring 21 having one end 23 thereof engaging about the socket 9, while its other end 24 is engaged with the detent.

The detachable head 5 is provided with a recess 24' in its inner face to rotatably receive the flange 3 of the drum body 1, or to receive an edge thereof as shown in Fig. 2, a suitable space being left between the detachable head and the flange 3 when the parts are assembled to accommodate the ratchet mechanism for the reel, such space being closed to prevent the entrance of the fishing line or any foreign matter to the ratchet parts. To the drum body 1 is secured by suitable fastenings a toothed ratchet wheel 25 having a central opening to permit passage of the spindle 6 and being disposed for engagement with a pawl 26 carried by a sliding plate 27 mounted within the recess 24 of the detachable head 5 and being shiftable by a button or pin 28 which projects on the exterior of the detachable head and operates in a slot 29 made therein. The pawl 26 is pivoted as indicated at 30 on the plate 27 which is provided with a bifurcated end 31 engaging about and guided by a bearing sleeve 32 for the spindle 6.

A circular spring 33 is secured as by screws or other fastenings 34 to the inside recessed face of the detachable head 5 and has its divided ends engaging at opposite sides of the wedge faces 35 and 36 on the point of the pawl 26, which is further provided with depressions 37 and 38 outwardly of the inclined faces 35 and 36 to receive the free ends of the spring when the pawl is in the inward position in engagement with the teeth of the ratchet wheel 25.

The detachable head 5 is provided on its outer face with a reinforcing frame structure 39 having radiating arms 40 secured as by screws or other fastenings 41 to the head. The lowermost arm 40 is continued downwardly and provided with a laterally extending offset bracket 42 lying beneath the drum and carrying the wings 43 and 44 usually employed to lie against the metallic sleeve on the fishing rod and to receive the binding rings from opposite directions by which the reel as a whole is secured to the rod.

In use, the improved reel is secured to the fishing pole or rod by applying the members 43 and 44 to the portion of the rod provided to receive the same, and the usual rings on the rod are then moved up so as to engage the parts 43 and 44. The line is wound upon the drum body 1 between the head 2 and the flange 3 and it is strung out through the eyes on the rod and provided with the usual hooks and sinker or float. The pawl 26 is normally engaged with the ratchet wheel 25 so that the usual retarding and clicking action is had by reason of the pawl 26 resisting the rotation of the drum in proportion to the force exerted thereon by the spring 33 which acts in both directions on the pole and normally has its free ends engaged in the notches 37 and 38.

When, however, it is desired to have the reel run free, the button 28 is moved outwardly to shift the plate 27 and consequently the pawl 26 away from engagement with the ratchet wheel 25. In this position, as is shown very clearly in Fig. 6, the free ends of the spring 33 engage the wedge walls 35 and 36 of the pawl and tend to hold it outwardly and prevent it from accidentally getting back into engagement with the ratchet wheel until positively moved to this position. The reel may be separated as indicated in Fig. 5 by shifting the pin 22 in the slot 17 against the influence of the coil spring 21, this movement being accompanied by a swinging of the detent 19 out of the groove 20.

In replacing the spindle 6 through the opening 7 in the drum, an inclined or conical surface 45 on the spindle will engage the side of the detent 19 and automatically move it backward out of the path of the larger portion of the spindle to permit the proper centering of the reduced end 8 of the spindle in the socket 9. As soon as the groove 20 comes into registry with the detent 19 the coil spring 21 will act to shift the latter into interlocking engagement such as will hold the detachable head 5 securely in place and yet by virtue of the annular character of the groove 20, the detent 19 may slip around therein to avoid interference with the rotary movement of the reel.

From the foregoing it will be appreciated that I have provided a reel of a suitably large character, yet of a light weight and of a readily operable material, character and construction in which the split end of the detachable device permits of separating the detachable head to expose all parts of the ratchet mechanism for the repair, adjustment and replacement of parts. It will further be appreciated that the drum portion of the reel is wholly detachable from the head 5 so that the fishing line may be entirely removed from the rod or pole and if desirable a number of the drums may be used in connection with a single head 5 which may be permanently mounted on the rod or pole, each separated drum carrying a line of different weight provided with hooks of different sizes and with either sinkers or floats or with other species of fishing tackle suitable to different varieties of the sport. In this way a single rod and head 5 provide for the reception of such different fishing tackle which may be readily mounted in conjunction with the rod or pole. Although the reel is shown to be of wooden construction herein, it of course may be made of stamped metal, hard rubber or other suitable material.

I have illustrated and described a preferred and satisfactory embodiment of my invention but it is obvious that changes may be made therein within the spirit and scope thereof as defined in the appended claims.

What is claimed is:—

1. A fishing reel comprising a head adapted to be carried by the fishing rod, a relatively short spindle projecting from the head, a reel body received against said head and having an axial opening for the passage of said spindle, said reel body having at its outer side a relatively deep recess communicating with the opening and receiving the spindle end, a removable plate closing the mouth of the recess and having an elongated socket projecting wholly inwardly of said plate and positioned to receive and support the end of the relatively short spindle, an elongated pivot carried by the plate at one side of said socket and projecting into the recess farther than the end of said socket, a detent swingingly secured on said pivot and adapted to interlock with the spindle, an elongated operated pin projecting through said plate and into the recess at the opposite side of said socket, said pin being connected with the free end of said detent, said plate being slotted to admit of the movement of the detent, and a spring associated with said pin and with said plate for normally urging the detent into the interlocked position.

2. A fishing reel comprising a head adapted for attachment to the fishing pole, a reel body detachably fitted against the side of said head and having an opening therethrough a recess communicating with the opening and arranged at the side of the reel body away from said head, a plate secured over the mouth of said recess and having an elongated socket projecting wholly inwardly of the plate and into the recess and being in alignment with said opening, a spindle carried by said head and adapted to enter the opening and recess in said reel body, said spindle composed of a major enlarged portion with an annular groove near its outer free end and of a minor reduced terminal portion adapted to fit rotatably within said socket, an elongated pivot carried by said plate projecting into the recess, a laterally swinging detent carried by said pivot inwardly of the socket and in the same plane with the groove in the enlarged portion of said spindle, a pin connected with the free end of said detent and projecting for arcuate movement through said plate, and a spring associated with said pin and with said socket for normally urging the detent into said groove.

In testimony that I claim the foregoing as my invention, I have signed my name hereunder.

WILLIAM C. MOLL.